United States Patent
Li

(10) Patent No.: US 10,234,924 B2
(45) Date of Patent: Mar. 19, 2019

(54) METHOD AND APPARATUS FOR DISPLAYING TIME ON MOBILE DEVICE

(71) Applicant: BEIJING XIAOMI MOBILE SOFTWARE CO., LTD., Beijing (CN)

(72) Inventor: Guosheng Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/892,689

(22) Filed: Feb. 9, 2018

(65) Prior Publication Data

US 2018/0232035 A1 Aug. 16, 2018

(30) Foreign Application Priority Data

Feb. 10, 2017 (CN) .......................... 2017 1 0075227

(51) Int. Cl.
*H04W 88/02* (2009.01)
*G06F 1/3206* (2019.01)
*G06F 1/32* (2019.01)
*G09G 5/00* (2006.01)
(Continued)

(52) U.S. Cl.
CPC .............. *G06F 1/3206* (2013.01); *G06F 1/32* (2013.01); *G09G 5/003* (2013.01);
(Continued)

(58) Field of Classification Search
CPC ............ H04M 1/72519; H04M 15/00; H04M 1/72522; H04M 1/72547; H04M 1/72555; H04M 1/72561; H04M 2215/2026; H04M 2215/2093; H04M 2250/02; H04M 1/72533; H04M 1/0266; H04M 2250/10; H04M 1/72572; H04M 2250/22; H04M 1/0241; H04M 1/72569; H04M 2250/74; H04M 1/72586; H04M 3/565;
(Continued)

(56) References Cited

U.S. PATENT DOCUMENTS

2014/0189395 A1 7/2014 Kp
2016/0259459 A1 9/2016 Yang et al.
(Continued)

FOREIGN PATENT DOCUMENTS

CN 104143321 A 11/2014
CN 106354368 A 1/2017
(Continued)

OTHER PUBLICATIONS

Extended European Search Report dated Mar. 7, 2018 in Patent Application No. 17199113.6.
(Continued)

*Primary Examiner* — Nimesh Patel
(74) *Attorney, Agent, or Firm* — Oblon, McClelland, Maier & Neustadt, L.L.P.

(57) ABSTRACT

The present disclosure relates to a method and a device for displaying time on a mobile device. The method includes detecting a first preset operation for displaying device time when a screen of the mobile device is off; computing the device time via a touch chip; sending the device time from the touch chip to a display driver chip, wherein the touch chip is configured to acquire standard time when an application processor is in a sleep state and to compute the device time based on an internal clock; activating the screen; and displaying the device time on the screen via the display driver chip.

15 Claims, 7 Drawing Sheets

(51) Int. Cl.
*H04W 52/02* (2009.01)
*G06F 3/0488* (2013.01)
*G06F 3/041* (2006.01)

(52) U.S. Cl.
CPC ....... *H04W 52/0254* (2013.01); *G06F 3/0416* (2013.01); *G06F 3/0488* (2013.01); *G09G 2330/022* (2013.01); *G09G 2330/026* (2013.01); *G09G 2330/027* (2013.01); *G09G 2360/144* (2013.01)

(58) Field of Classification Search
CPC ......... H04M 1/72583; H04M 2201/40; H04W 40/02; H04W 56/00; H04W 4/00; H04W 4/02; H04W 4/025
See application file for complete search history.

(56) References Cited

U.S. PATENT DOCUMENTS

2017/0285851 A1 10/2017 Yang et al.
2018/0046317 A1 2/2018 Yang et al.

FOREIGN PATENT DOCUMENTS

CN 106897009 A 6/2017
EP 2 857 932 A1 4/2015

OTHER PUBLICATIONS

International Search Report and Written Opinion dated Oct. 26, 2017 in PCT/CN2017/095521.

METHOD AND APPARATUS FOR DISPLAYING TIME ON MOBILE DEVICE

CROSS REFERENCE TO RELATED APPLICATIONS

This application is based upon and claims a priority to Chinese Patent Application Serial No. 201710075227.6, filed with the State Intellectual Property Office of P. R. China on Feb. 10, 2017, the entire contents of which are incorporated herein by reference.

TECHNICAL FIELD

The present disclosure relates to the field of electronic technology, and more particularly, to a method and an apparatus for displaying time on a mobile device.

BACKGROUND

With a widespread use of a mobile device, users are increasingly relying on viewing time through the mobile device. However, as a screen of the mobile device is frequently switched on for viewing time, power consumption is relatively high, thereby greatly shortening battery life of the mobile device. In related arts, the mobile device may have an Always-On function to achieve a long-time display without operations on the screen. However, an implementation of the Always-On function still requires waking up an application processor (AP for short) at a certain interval (such as every one minute) to compute device time. As power consumption caused by waking up the application processor to compute the device time is relative high, power of the mobile device may be consumed in a high speed, thereby greatly shorten the battery life of the mobile device.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for displaying time on a mobile device. The method includes detecting a first preset operation for displaying device time when a screen of the mobile device is off; computing the device time via a touch chip; sending the device time from the touch chip to a display driver chip, wherein the touch chip is configured to acquire standard time when an application processor is in a sleep state and to compute the device time based on an internal clock; activating the screen; and displaying the device time on the screen via the display driver chip.

According to an aspect, the method also includes determining to deactivate the screen; and in response to determining to deactivate the screen, switching the application processor to the sleep state and synchronizing standard time corresponding to a moment that the application processor is switched to the sleep state to the touch chip.

According to another aspect, the method also includes detecting a second preset operation for starting the application processor when the screen of the mobile device is on; preventing transmission of the device time from the touch chip to the display driver chip when the second preset operation for starting the application processor is detected; starting the application processor and sending standard time computed by the application processor to the display driver chip; and displaying the standard time on the screen via the display driver chip.

In an example, when activating the screen and displaying the device time on the screen via the display driver chip, the method includes driving a data line and a control line of a touch panel, via the display driver chip, to activate the screen and display the device time on the screen.

In another example, when activating the screen and displaying the device time on the screen via the display driver chip, the method includes determining a preset brightness threshold based on a current ambient brightness; and activating the screen with the preset brightness threshold and displaying the device time on the screen via the display driver chip.

In yet another example, when detecting the first preset operation, the method includes detecting one of a double-click operation on the screen when the screen is off, and a press operation on a power button.

Aspects of the disclosure also provide an apparatus for displaying time on a mobile device. The apparatus includes a processor and a memory configured to store at least one instruction executable by the processor. The processor is configured to detect a first preset operation for displaying device time when a screen of the mobile device is off; compute the device time via a touch chip; send the device time from the touch chip to a display driver chip, wherein the touch chip is configured to acquire standard time when an application processor is in a sleep state and to compute the device time based on an internal clock; activate the screen; and display the device time on the screen via the display driver chip.

Aspects of the disclosure also provide a non-transitory computer-readable storage medium having stored therein instructions that, when executed by one or more processors of a mobile device, cause the mobile device to detect a first preset operation for displaying device time when a screen of the mobile device is off; compute the device time via a touch chip; send the device time from the touch chip to a display driver chip, wherein the touch chip is configured to acquire standard time when an application processor is in a sleep state and to compute the device time based on an internal clock; activate the screen; and display the device time on the screen via the display driver chip.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of devices and methods consistent with aspects related to the disclosure as recited in the appended claims.

Figure 1:
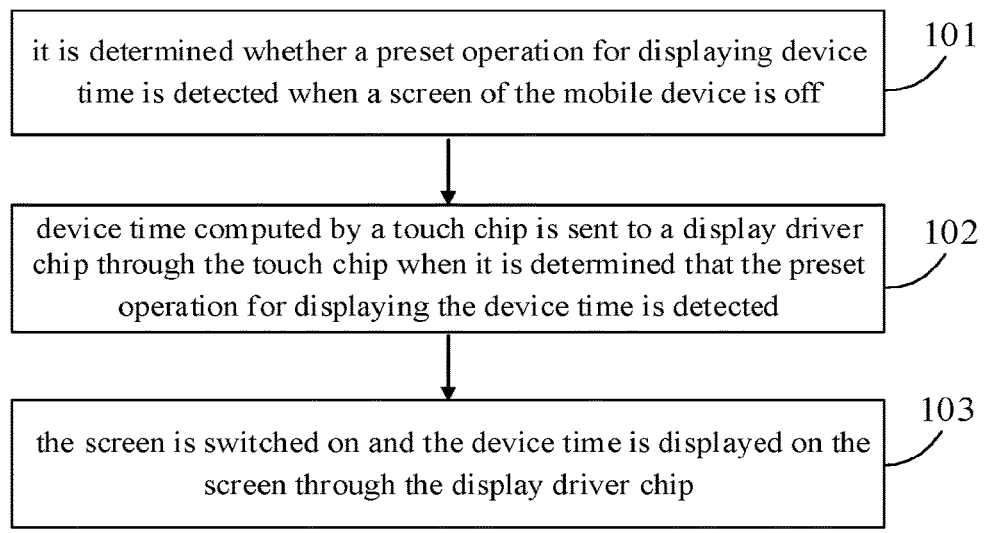
FIG. 1 is a flow chart illustrating a method for displaying time on a mobile device according to an exemplary aspect of the present disclosure.

FIG. 1 is a flow chart illustrating a method for displaying time on a mobile device according to an exemplary aspect. The method may be applied in a mobile device, such as a smart phone, a tablet computer and the like. As illustrated in FIG. 1, the method includes following acts 101-103.

At act 101, it is determined whether a preset operation for displaying device time is detected when a screen of the mobile device is off In an aspect, the preset operation may be a specific operation pre-defined to display time. For example, the preset operation is a double-click operation on the screen, a press operation on a power button or the like.

At act 102, device time computed by a touch chip is sent to a display driver chip through the touch chip when it is determined that the preset operation for displaying the device time is detected.

In an aspect, the touch chip is configured to acquire standard time when an application processor is closed, and to compute the device time according to an internal clock.

In an aspect, the touch chip may compute the device time according to the internal clock during a period that the screen is off. Therefore, it may be avoided to wake up the application processor at a certain interval (such as every one minute) to compute the device time during the period that the screen is off.

In an aspect, when the preset operation is received on a touch panel, the device time computed by the touch chip may be sent to the display driver chip through the touch chip.

In another aspect, the touch chip to achieve above functions and the display driver chip to achieve above functions may be integrated on a single chip.

At act 103, the screen is switched on and the device time is displayed on the screen through the display driver chip.

In an aspect, the display driver chip may drive a data line and a control line of the touch panel, such that the device time and other required device information may be displayed by the touch panel on the screen.

In an aspect, the display driver chip may display the device time on the screen with a relatively low brightness, which may be understood with reference to aspects illustrated as FIG. 3A and 3B below and is not elaborated here.

In aspects, when the screen is off and the preset operation for displaying the device time is detected, the device time computed by the touch chip may be sent to the display driver chip through the touch chip, the screen is switched on and the device time is displayed on the screen through the display driver chip. As the device time may be computed through the touch chip with low power consumption according to the internal clock, rather than through the application processor, it is not required to wake up the application processor when a user views time, so as to avoid power consumption resulted from waking up the application processor to compute time. As a result, the power consumption is greatly reduced when the user views the time and battery life of the mobile device is prolonged.

In an aspect, acquiring standard time when an application device is closed through the touch chip includes followings.

When it is determined to switch off the screen, the application processor is closed and standard time corresponding to a moment that the application processor is closed is synchronized to the touch chip.

In an aspect, the method further includes followings.

When the screen is on, it is prevented to send the device time to the display driver chip through the touch chip when a preset operation for starting the application processor is detected, the application processor is started and standard time computed by the application processor is sent to the display driver device.

Furthermore, the standard time is displayed on the screen through the display driver chip.

In an aspect, switching on the screen and displaying the device time on the screen through the display driver chip includes followings.

The data line and the control line of the touch panel are driven, the screen is switched on and the device time is displayed on the screen through the display driver chip.

In an aspect, switching on the screen and displaying the device time on the screen through the display driver chip includes followings.

A preset brightness threshold is determined according to a current ambient brightness.

Furthermore, the screen is switched on with the preset brightness threshold and the device time is displayed on the screen through the display driver chip.

In an aspect, determining whether the preset operation for displaying the device time is detected includes followings.

When the screen is off, it is determined that the preset operation for displaying device time is detected if a double-click operation on the screen is detected.

Alternatively, when the screen is off, it is determined that the preset operation for displaying device time is detected if a press operation on a power button is detected.

In detail, how to display the device time may be referred to following aspects.

With the method provided in aspects of the present disclosure, when the screen is off, the device time may be computed through the touch chip with low power consumption according to the internal clock, rather than through the application processor. Therefore, it is not required to wake up the application processor when the user views time, so as to avoid power consumption resulted from waking up the application processor to compute time. As a result, the power consumption is greatly reduced when the user views time and battery life of the mobile device is prolonged.

Figure 2:
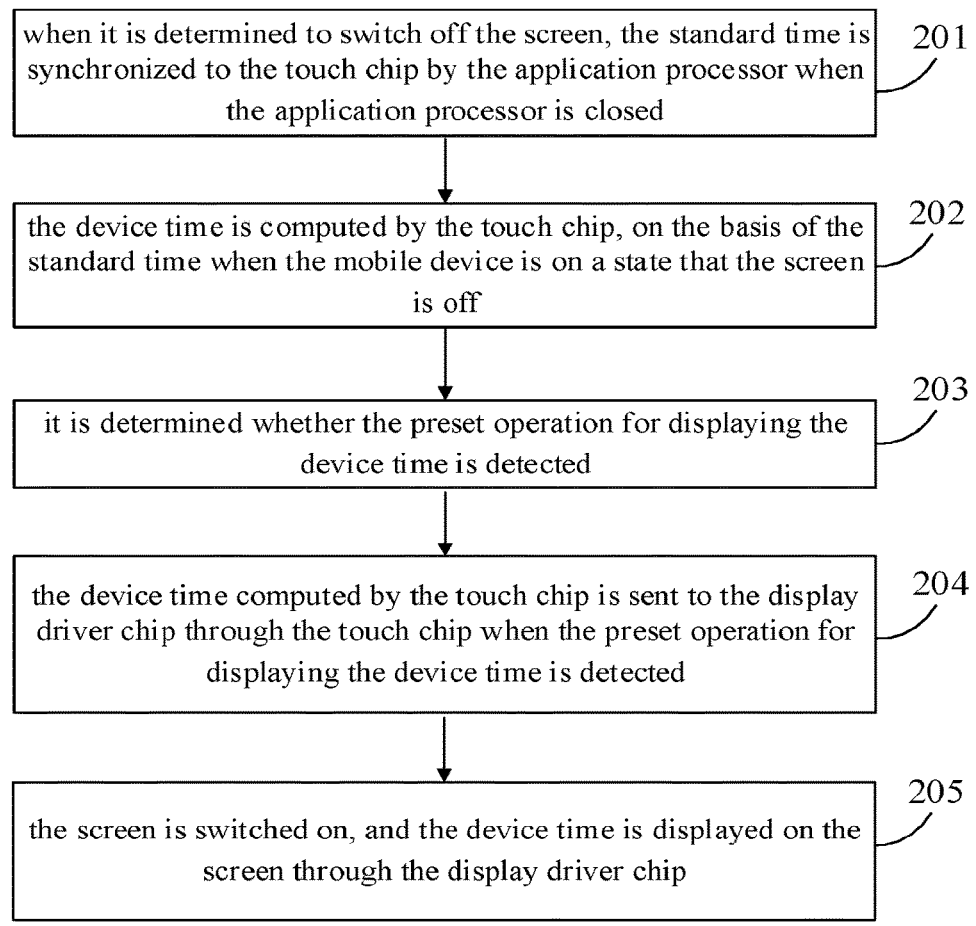
FIG. 2 is a flow chart illustrating a method for displaying time on a mobile device according to an exemplary aspect of the present disclosure.

FIG. 2 is a flow chart illustrating a method for displaying time on a mobile device according to an exemplary aspect. The exemplary aspect employs the above method provided in aspects of the present disclosure. How to display the device time is taken as an example for illustrative purpose. As illustrated in FIG. 2, the method includes followings.

At act 201, when it is determined to switch off the screen, the standard time is synchronized to the touch chip by the application processor when the application processor is closed.

In an aspect, by synchronizing the current standard time of the mobile device to the touch chip through the application processor immediately before the screen is switched off, an accuracy of the device time computed by the touch chip may be improved.

At act 202, the device time is computed by the touch chip, on the basis of the standard time when the mobile device is on a state that the screen is off In an aspect, the touch chip may compute the device time in cooperation with the internal clock on the basis of the standard time.

At act 203, it is determined whether the preset operation for displaying the device time is detected. An act 204 is executed if the preset operation for displaying the device time is detected.

In an aspect, when the screen is off, it is determined that the preset operation for displaying the device time is detected if a double-click operation on the screen is detected. In another aspect, it is determined that the preset operation for displaying the device time is detected if a press operation on a power button is detected.

At act 204, the device time computed by the touch chip is sent to the display driver chip through the touch chip when the preset operation for displaying the device time is detected.

In an aspect, the touch chip acquires the standard time when the application processor is closed, and obtains the device time according to the internal clock.

At act 205, the screen is switched on, and the device time is displayed on the screen through the display driver chip.

In an aspect, descriptions of acts 203-205 can be referred to above descriptions of acts 101-103 in aspects illustrated as FIG. 1, which are not elaborated herein.

In aspects, by synchronizing the current standard time to the touch chip through the application processor every time when it is required to switch off the screen, an error of the device time computed through the touch chip according to the internal clock may be reduced, thereby improving an accuracy of the device time.

Figure 3A:
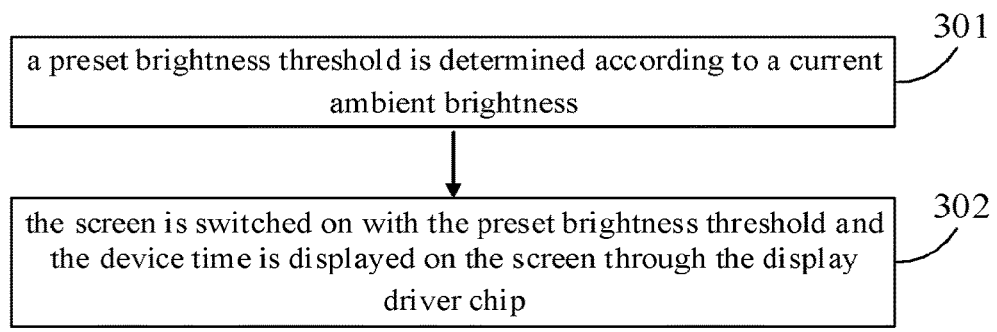
FIG. 3A is flow chart one illustrating a time display through a display driver chip according to an exemplary first aspect of the present disclosure.

FIG. 3A is flow chart one illustrating a time display through a display driver chip according to an exemplary first aspect. FIG. 3B is flow chart two illustrating a time display through a display driver chip according to an exemplary second aspect. The first and second aspects both employ the above method provided in aspects of the present disclosure. How to display the device time is taken as an example for illustrative purpose. As illustrated in FIG. 3A, a flow chart of a time display when the preset operation for displaying the device time is detected while the screen is off is illustrated and includes followings.

At act 301, a preset brightness threshold is determined according to a current ambient brightness.

In an aspect, the preset brightness threshold corresponding to the current ambient brightness may be set empirically. The preset brightness threshold may be obtained from statistic data generated by a large amount of users through a provider of the mobile device and may be stored in the mobile device. For example, when the current ambient brightness is high, the preset brightness threshold may be set relatively high, thereby ensuring a clear view of the user. However, the preset brightness threshold cannot be set too high, taking a clear view and low power consumption as standards.

In an aspect, the ambient brightness may be measured through the mobile device during a period that the mobile device is under test. Therefore, the preset brightness threshold with which information output by the mobile device may be displayed clearly is determined and is stored in the mobile device.

At act 302, the screen is switched on with the preset brightness threshold and the device time is displayed on the screen through the display driver chip.

In an aspect, the device time may be displayed with the preset brightness threshold by controlling a backlight brightness. As the backlight brightness may be set very small, the power consumption may be saved.

Figure 3B:
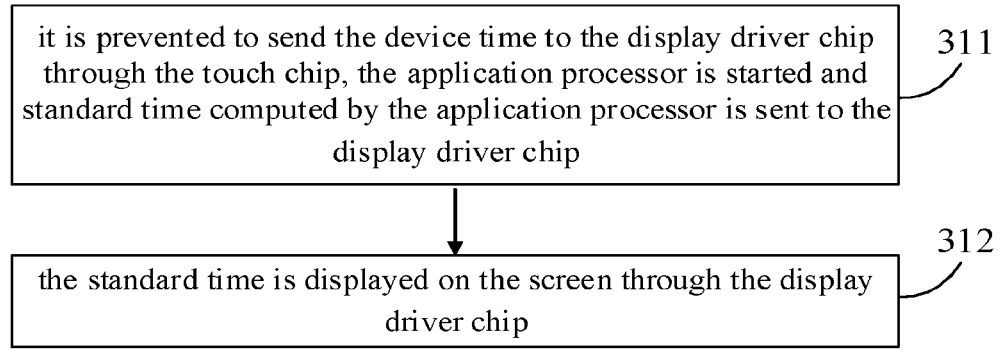
FIG. 3B is flow chart two illustrating a time display through a display driver chip according to an exemplary second aspect of the present disclosure.

As illustrated in FIG. 3B, a flow chart of a time display on the mobile device when the preset operation for starting the application processor is detected while the screen is on is illustrated and includes followings.

At act 311, it is prevented to send the device time to the display driver chip through the touch chip, the application processor is started and standard time computed by the application processor is sent to the display driver chip.

At act 312, the standard time is displayed on the screen through the display driver chip.

In an aspect, by displaying the device time on the screen with the preset brightness threshold lower than the ambient brightness through controlling the display driver chip, the power consumption may be further reduced. Furthermore, after the screen is switched on and the application processor is started, the device time computed by the application processor may be displayed on the screen, thereby improving an accuracy of the device time.

Figure 4:
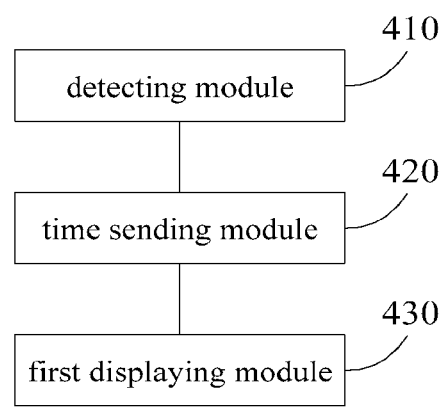
FIG. 4 is a block diagram illustrating a device for displaying time on a mobile device according to an exemplary aspect of the present disclosure.

FIG. 4 is a block diagram illustrating a device for displaying time on a mobile device according to an exemplary aspect. As illustrated in FIG. 4, the device includes a detecting module 410, a time sending module 420 and a first displaying module 430.

The detecting module 410 is configured to determine whether a preset operation for displaying device time is detected when a screen of the mobile device is off.

The time sending module 420 is configured to send device time computed by a touch chip to a display driver chip through the touch chip when it is determined that the preset operation for displaying the device time is detected through the detecting module 410, in which the touch chip is configured to acquire standard time when an application processor is closed and to compute the device time according to an internal clock.

The first displaying module 430 is configured to switch on the screen and to display the device time sent by the time sending module 420 on the screen through the display driver chip.

Figure 5:
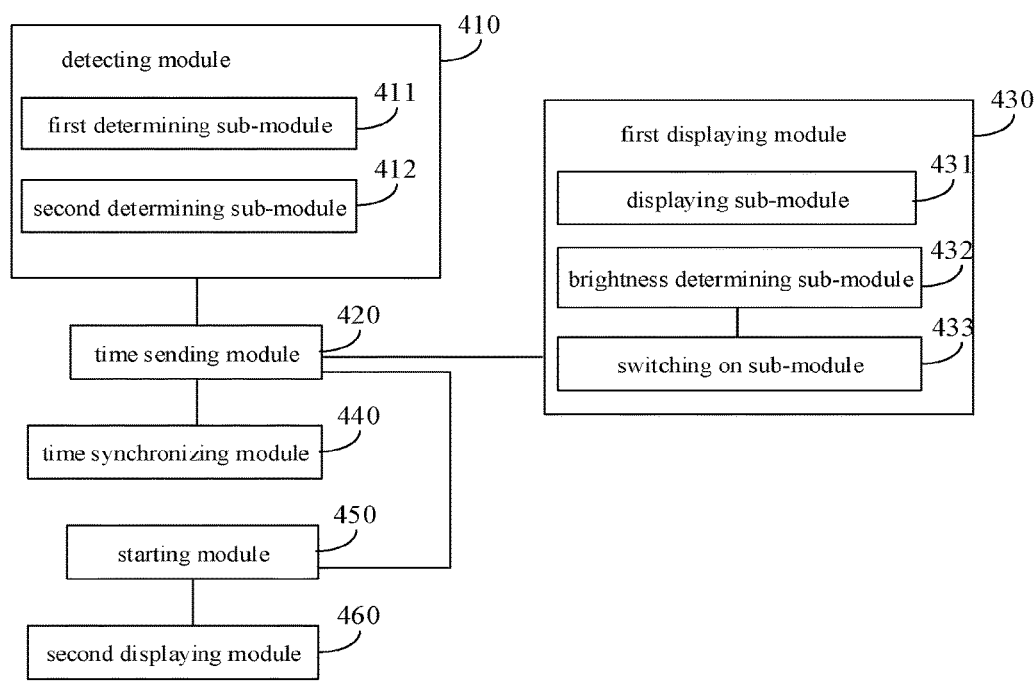
FIG. 5 is a block diagram illustrating another device for displaying time on a mobile device according to an exemplary aspect of the present disclosure.

FIG. 5 is a block diagram illustrating another device for displaying time on a mobile device according to an exemplary aspect. As illustrated in FIG. 5, on the basis of aspects illustrated in FIG. 4, in an aspect, the device further includes a time synchronizing module 440.

The time synchronizing module 440 is configured to close the application processor and to synchronize standard time corresponding to a moment that the application processor is closed to the touch chip when it is determined to switch off the screen.

In an aspect, the device further includes a starting module 450 and a second displaying module 460.

The starting module 450 is configured, when the screen is on, to prevent to send the device time to the display driver chip through the touch chip when a preset operation for starting the application processor is detected, to start the application processor and to send standard time computed by the application processor to the display driver chip.

The second displaying module 460 is configured to display the standard time determined by the starting module 450 on the screen through the display driver chip.

In an aspect, the first displaying module 430 includes a displaying sub-module 431.

The displaying sub-module 431 is configured to drive a data line and a control line of a touch panel, to switch on the screen and display the device time on the screen through the displaying and the driving chip.

In an aspect, the first displaying module 430 includes a brightness determining sub-module 432 and a switching on sub-module 433.

The brightness determining sub-module 430 is configured to determine a preset brightness threshold according to a current ambient brightness.

The switching on sub-module 433 is configured to switch on the screen with the preset brightness threshold and to display the device time on the screen through the display driver chip.

In an aspect, the detecting module 410 includes a first determining sub-module 411 or a second determining sub-module 412.

The first determining sub-module 411 is configured to determine that the preset operation for displaying the device time is detected if a double-click operation on the screen is detected when the screen is off.

The second determining sub-module 412 is configured to determine that the preset operation for displaying the device time is detected if a press operation on a power button is detected.

Regarding to the device illustrated in above aspects, specific implementations of each module may be referred to descriptions of the method illustrated in above aspects, where are not elaborated herein.

Figure 6:
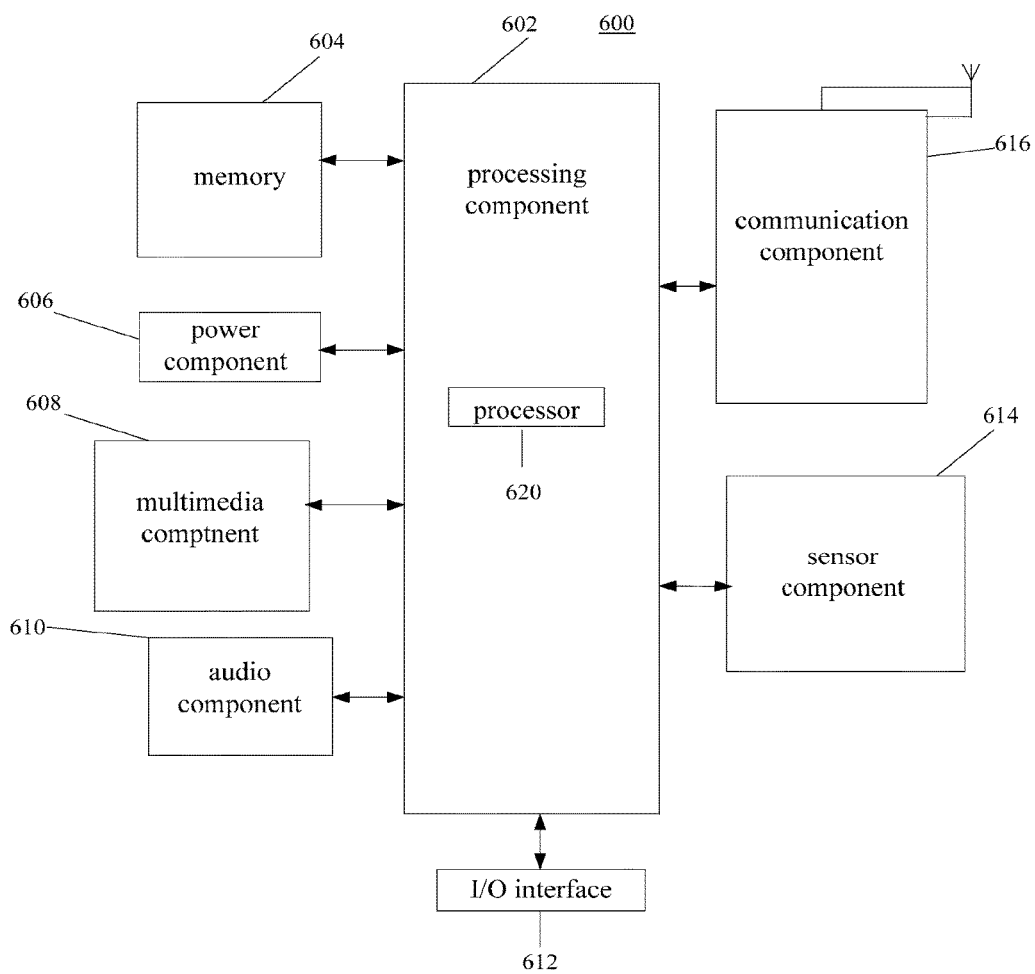
FIG. 6 is a block diagram illustrating an apparatus that is suitable to display time on a mobile device according to an exemplary aspect of the present disclosure.

FIG. 6 is a block diagram an apparatus that is suitable to display time on a mobile device according to an exemplary aspect. For example, the apparatus 600 may be a mobile phone, tablet computer or the like.

Referring to FIG. 6, the apparatus 600 may include the following one or more components: a processing component 602, a memory 604, a power component 606, a multimedia component 608, an audio component 610, an Input/Output (I/O) interface 612, a sensor component 614, and a communication component 616.

The processing component 602 typically controls overall operations of the apparatus 600, such as the operations associated with display, telephone calls, data communications, camera operations, and recording operations. The processing component 602 may include one or more processors 620 to execute instructions to perform all or part of the acts in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and the user. In some aspects, the screen may include a liquid crystal display (LCD) and a press panel (TP). If the screen includes the touchable panel, the screen may be implemented as a touch screen to receive input signals from the user. The touchable panel includes one or more touch sensors to sense touches, swipes, and other gestures on the touchable panel. The touch sensors may not only sense a boundary of a touch or swipe action, but also sense a duration time and a pressure associated with the touch or swipe action. In some aspects, the multimedia component 608 includes a front camera and/or a rear camera. The front camera and/or the rear camera may receive external multimedia data while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, and a voice recognition mode. The received audio signal may be further stored in the memory 604 or transmitted via the communication component 616. In some aspects, the audio component 610 further includes a speaker to output audio signals.

The I/O interface 612 provides an interface for the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the apparatus 600. For instance, the sensor component 614 may detect an open/closed status of the apparatus 600 and relative positioning of components (e.g. the display and the keypad of the apparatus 600). The sensor component 614 may also detect a change in position of the apparatus 600 or of a component in the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some aspects, the sensor component 614 may also include an accelerometer sensor, a gyroscope sensor, a magnetic sensor, a pressure sensor, or a temperature sensor.

The communication component 616 is configured to facilitate wired or wireless communication between the apparatus 600 and other apparatuses. The apparatus 600 can access a wireless network based on a communication standard, such as WIFI, 2G, or 3G; or a combination thereof. In one exemplary aspect, the communication component 616 receives a broadcast signal or broadcast associated information from an external broadcast management system via a broadcast channel. In one exemplary aspect, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method for displaying time on a mobile device. The method includes followings.

It is determined whether a preset operation for displaying device time is detected when a screen of the mobile device is off.

The device time computed by a touch chip is sent to a display driver chip through the touch chip when the preset operation for displaying the device time is detected. The touch chip is configured to acquire standard time when an application processor is closed and to compute the device time according to an internal clock.

The screen is switched on and the device time is displayed on the screen through the display driver chip.

In exemplary aspects, there is also provided a non-transitory computer readable storage medium having instructions, such as the memory 604 including instructions. The instructions may be executed by the processors 620 of the apparatus 600 to perform the above method for displaying time on a mobile device. For example, the non-transitory computer-readable storage medium may be a ROM, a RAM, a CD-ROM, a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method for displaying time on a mobile device, comprising:
   detecting a first preset operation for displaying device time when a screen of the mobile device is off;
   computing the device time via a touch chip;
   sending the device time from the touch chip to a display driver chip, wherein the touch chip is configured to acquire standard time when an application processor is in a sleep state and to compute the device time based on an internal clock;
   activating the screen;
   displaying the device time on the screen via the display driver chip;
   detecting a second preset operation for starting the application processor when the screen of the mobile device is on;
   preventing transmission of the device time from the touch chip to the display driver chip when the second preset operation for starting the application processor is detected;
   starting the application processor and sending standard time computed by the application processor to the display driver chip; and
   displaying the standard time on the screen via the display driver chip.

2. The method according to claim 1, further comprising:
   determining to deactivate the screen; and
   in response to determining to deactivate the screen, switching the application processor to the sleep state and synchronizing standard time corresponding to a moment that the application processor is switched to the sleep state to the touch chip.

3. The method according to claim 1, wherein activating the screen and displaying the device time on the screen via the display driver chip comprises:
   driving a data line and a control line of a touch panel, via the display driver chip, to activate the screen and display the device time on the screen.

4. The method according to claim 1, wherein activating the screen and displaying the device time on the screen via the display driver chip comprises:
   determining a preset brightness threshold based on a current ambient brightness; and
   activating the screen with the preset brightness threshold and displaying the device time on the screen via the display driver chip.

5. The method according to claim 1, wherein detecting the first preset operation includes one of:
   detecting a double-click operation on the screen when the screen is off; and
   detecting a press operation on a power button.

6. An apparatus for displaying time on a mobile device, comprising:
   a processor; and
   a memory configured to store at least one instruction executable by the processor;
   wherein the processor is configured to:
   detect a first preset operation for displaying device time when a screen of the mobile device is off;
   compute the device time via a touch chip;

send the device time from the touch chip to a display driver chip, wherein the touch chip is configured to acquire standard time when an application processor is in a sleep state and to compute the device time based on an internal clock;
activate the screen;
display the device time on the screen via the display driver chip;
detect a second preset operation for starting the application processor when the screen of the mobile device is on;
prevent transmission of the device time from the touch chip to the display driver chip when the second preset operation for starting the application processor is detected;
start the application processor and send standard time computed by the application processor to the display driver chip; and
display the standard time on the screen via the display driver chip.

7. The apparatus according to claim 6, wherein the processor is further configured to:
determine to deactivate the screen; and
in response to determining to deactivate the screen, switch the application processor to the sleep state and synchronize standard time corresponding to a moment that the application processor is switched to the sleep state to the touch chip.

8. The apparatus according to claim 6, wherein, when activating the screen and displaying the device time on the screen via the display driver chip, the processor is further configured to:
drive a data line and a control line of a touch panel, via the display driver chip, to activate the screen and display the device time on the screen.

9. The apparatus according to claim 6, wherein, when activating the screen and displaying the device time on the screen via the display driver chip, the processor is further configured to:
determine a preset brightness threshold based on a current ambient brightness; and
activate the screen with the preset brightness threshold and display the device time on the screen via the display driver chip.

10. The apparatus according to claim 6, wherein the processor is configured to determine the first preset operation by one of:
detecting a double-click operation on the screen when the screen is off; and
detecting a press operation on a power button.

11. A non-transitory computer-readable storage medium having stored therein instructions that, when executed by one or more processors of a mobile device, cause the mobile device to:
detect a first preset operation for displaying device time when a screen of the mobile device is off;
compute the device time via a touch chip;
send the device time from the touch chip to a display driver chip, wherein the touch chip is configured to acquire standard time when an application processor is in a sleep state and to compute the device time based on an internal clock;
activate the screen;
display the device time on the screen via the display driver chip;
detect a second preset operation for starting the application processor when the screen of the mobile device is on;
prevent transmission of the device time from the touch chip to the display driver chip when the second preset operation for starting the application processor is detected;
start the application processor and send standard time computed by the application processor to the display driver chip; and
display the standard time on the screen via the display driver chip.

12. The non-transitory computer-readable storage medium according to claim 11, wherein the instructions further cause the mobile device to:
determine to deactivate the screen; and
in response to determining to deactivate the screen, switch the application processor to the sleep state and synchronizing standard time corresponding to a moment that the application processor is switched to the sleep state to the touch chip.

13. The non-transitory computer-readable storage medium according to claim 11, wherein, when activating the screen and displaying the device time on the screen via the display driver chip, the instructions further cause the mobile device to:
drive a data line and a control line of a touch panel, via the display driver chip, to activate the screen and displaying display the device time on the screen.

14. The non-transitory computer-readable storage medium according to claim 11, wherein, when activating the screen and displaying the device time on the screen via the display driver chip, the instructions further cause the mobile device to:
determine a preset brightness threshold based on a current ambient brightness; and activate the screen with the preset brightness threshold and display the device time on the screen via the display driver chip.

15. The non-transitory computer-readable storage medium according to claim 11, wherein the instructions cause the mobile device to determine the first preset operation by one of:
detecting a double-click operation on the screen when the screen is off; and
detecting a press operation on a power button.

* * * * *